United States Patent [19]

Schnupp

[11] Patent Number: 4,639,216
[45] Date of Patent: Jan. 27, 1987

[54] GRAIN ROASTING MACHINE AND METHOD

[75] Inventor: Dale L. Schnupp, Lebanon, Pa.

[73] Assignee: Schnupp's Grain Roasting, Inc., Lebanon, Pa.

[21] Appl. No.: 840,976

[22] Filed: Mar. 13, 1986

Related U.S. Application Data

[63] Continuation of Ser. No. 727,310, Apr. 25, 1985, abandoned.

[51] Int. Cl.$^4$ ............................................. F27B 7/14
[52] U.S. Cl. .................................... 432/105; 432/108; 432/114; 432/118
[58] Field of Search ................. 432/14, 105, 108, 110, 432/114, 118

[56] References Cited

U.S. PATENT DOCUMENTS

| | | | |
|---|---|---|---|
| 1,709,456 | 4/1929 | Bojner et al. | 432/118 |
| 1,987,242 | 1/1935 | Madsen | 34/137 |
| 2,354,567 | 7/1944 | Adt | 34/137 |
| 2,388,298 | 11/1945 | Stephens | 99/68 |
| 2,506,739 | 5/1950 | Raypholtz | 34/137 |
| 2,578,166 | 12/1951 | Bill | 14/136 |
| 2,709,306 | 5/1955 | Magnusson et al. | 34/138 |
| 3,024,538 | 3/1962 | Madsen | 34/135 |
| 3,206,526 | 9/1965 | Rygaard | 432/108 |
| 3,331,142 | 7/1967 | Rossi | 34/135 |
| 3,406,465 | 10/1968 | Dahlund | 34/135 |
| 3,607,121 | 9/1971 | Watson et al. | 432/118 |
| 3,817,697 | 6/1974 | Parobek | 432/105 |
| 3,910,756 | 10/1975 | Henning | 432/118 |
| 4,189,300 | 12/1980 | Butler | 34/135 |
| 4,300,837 | 11/1981 | Malbrunot | 432/118 |
| 4,307,520 | 12/1981 | Lutz | 432/118 |

*Primary Examiner*—Henry C. Yuen
*Attorney, Agent, or Firm*—Michael R. Swartz; John R. Flanagan

[57] ABSTRACT

A grain roasting machine includes an elongated hollow roasting drum mounted for rotation about its fore-and-aft longitudinally-extending central axis and a burner for producing a roasting flame within the drum in a direction extending generally longitudinally of the drum from one end toward the other end of the drum. The flame is produced in the longitudinal direction but offset to one side of the central axis of the drum. Vanes disposed on the interior of the drum sidewall and extending longitudinally between the ends thereof carry grain placed in the drum along a first arcuate path which skirts the periphery of the flame and then drop the grain in a second linear path in which most of the grain falls across the drum and directly through the roasting flame before returning to the first path. The drum is constructed by welding or otherwise rigidly connecting a plurality of plates together at their longitudinal edges so as to form an endless ring-like structure which defines the continuous sidewall of the drum. Each of the plates has an integrally-formed flange, being connected to the plate along one of its longitudinal edges. The flanges extend generally radially inward toward the central longitudinal axis of the drum so as to define the grain carrying vanes.

3 Claims, 5 Drawing Figures

GRAIN ROASTING MACHINE AND METHOD

This is a continuation of co-pending application Ser. No. 06/727,310 filed on Apr. 25, 1985, now abandoned.

CROSS REFERENCE TO RELATED APPLICATION

Reference is hereby made to the following copending U.S. application dealing with subject matter related to the present invention: "Improved Grain Roasting Drum Construction" by Dale L. Schnupp, assigned U.S. Ser. No. 727,319 and filed Apr. 25, 1985, U.S. Pat. No. 4,592,150.

BACKGROUND OF THE INVENTION

1. Field of the Invention

The present invention relates generally to the processing of cereal grains for the production of animal feed and, more particularly, is concerned with a machine and method for roasting any cereal grain, such as soybeans, corn, wheat, barley, oats and the like, so as to convert its nutrients to a more digestable form and thereby increase the food value of the grain.

2. Description of the Prior Art

Grains from any of several cereal crops rank among the most important sources of food for livestock, poultry and other animals. Their high starch content makes them an excellent source of energy. Cereal grains most widely used in the United States include corn, oats, sorghum and barley. For example, by one account, farmers use about 80 percent of the U.S. corn crop as livestock feed.

Processing of grain to increase its nutritional value is a common practice. Any grain can be processed into feed. However, some can be fed directly in their natural state. For instance, corn is oftentimes fed directly. Still, there are many situations where farmers prefer to feed grains after limited processing, for example, corn after being mechanically cracked and other grains, such as oats and barley, after being mechanically rolled, to increase their digestability. These processing operations can generally be performed with equipment available for use on the farm.

On the other hand, some other cereal grains are unsuited for direct feeding in their natural state. They must be processed first to eliminate the harmful substances they contain naturally. For instance, soybeans have to be processed before being fed to livestock. Furthermore, heretofore, the conventional view has been that such processing has to be done off the farm at commercial plants in order to effectively remove the toxic enzymes in the raw soybeans and convert them into an edible form. Thus, since processed soybean meal is highly regarded as a source of protein and other nutrients, most farmers have fed their livestock a combined ration of grain in its natural state, or after limited on-the-farm processing, and mixed feeds commercially processed and prepared at off-the-farm commercial plants. Of course, the need to purchase commercially processed mixed feeds to supplement the natural grain fed to livestock substantially increases the cost of livestock feed for the farmer.

There is a growing view which takes the position that farmers can substantially eliminate the need for costly commercially processed feed supplements, such as soybean meal, by taking much less costly steps on the farm to produce their own protein and increase the overall nutrient value of their grains. This is accomplished by roasting soybeans as well as any other of the cereal grains. A feed ration of roasted grains and roasted soybeans, in which a pound of on-the-farm roasted soybeans is exchanged for a pound of off-the-farm, commercially-processed soybean meal, will lower the cost and proportionately increase the profitability of livestock and poultry production operations for everyone from the smallest family farm to the largest cattle ranch.

It is believed that dry heat at a high temperature destroys the toxic enzymes in the raw soybeans which interferes with digestion and growth in all animals. The process of roasting in an open flame sterilizes the grain, reducing toxicity. Also, importantly, oil and soy lecithin are retained in the whole roasted soybean. They are excellent sources of concentrated energy. By roasting the soybean, it is converted to a more digestable form. Packing extra energy into the feed ration will consistently increase livestock and poultry production on less feed which greatly improves feed efficiency. Roasting of other grains has beneficial results also. It destroys mold and changes the starches to dextrin, a simple form of carbohydrate that can be readily digested and more freely utilized by the animal.

Consequently, a need exists for a technique of roasting cereal grains on the farm which will effectively process the grains such that the aforementioned objectives will be achieved. Many different machines appear in the prior art for drying and roasting different materials. Representative of the prior art are the machines disclosed in Madsen (U.S. Pat. No. 1,987,242), Raypholtz (U.S. Pat. No. 2,506,739), Magnusson et al (U.S. Pat. No. 2,709,306), Madsen (U.S. Pat. No. 3,024,538) and Butler (U.S. Pat. No. 4,189,300) for drying aggregate, in Adt (U.S. Pat. No. 2,354,567) for drying tobacco, in Stephens (U.S. Pat. No. 2,388,298) for roasting coffee, beans, grains and the like, in Bill (U.S. Pat. No. 2,578,166) for drying chopped hay, grasses, vegetable crops and the like, in Rossi (U.S. Pat. No. 3,331,142) for drying and toasting bread crumbs, and in Dahlund (U.S. Pat. No. 3,406,465) for drying grain.

While all of the above-cited prior machines probably operated reasonably well and generally achieved their objectives under the range of operating conditions for which they were designed, none appears to be particularly useful for the purpose of roasting grain to increase its food value and, thus, a need still exists for an alternate machine which is simplier, less costly and will effectively roast grains so as to make them more digestable and enhance their nutritional value as livestock feed.

SUMMARY OF THE INVENTION

The preferred embodiment of a grain roasting machine as disclosed herein, includes several improved features which meet the aforementioned needs. While the improved features are particularly adapted for working together to facilitate the roasting of grain in an improved manner, it is readily apparent that such features may be incorporated either singly or together in a grain roasting machine.

One of the improved features comprises the invention claimed in the copending application, cross-referenced above; however, both improved features are illustrated and described herein for facilitating a complete and thorough understanding of the feature comprising the present invention.

The present invention relates to a grain roasting machine and method in which, as a roasting drum in the machine is rotated, grain is conveyed longitudinally through the drum concurrently as it is carried along an arcuate path within the drum which skirts about one side of the periphery of a roasting flame directed longitudinally of the roasting drum. After reaching an upper portion of the arcuate path, the grain is then dropped along a generally linear path across the drum and through the flame as the drum is rotated. Contact of the flame directly with a large mass of grain avoids burning of the grain. By roasting soybeans in the machine of the present invention, protein can be made on the farm from soybeans raised on the farm. This translates into reduced cost of, and higher nutritional value in, the protein produced by roasting the soybeans.

Accordingly, the present invention is directed to a grain roasting machine and method, which utilizes the following combination of operative steps: (a) directing a roasting flame into an elongated hollow roasting drum in a longitudinal direction extending from one end toward an opposite end of the drum; (b) rotating the drum about its fore-and-aft extending central axis; (c) delivering grain in the longitudinal direction into the drum at the one end thereof; and (d) conveying grain within the drum by carrying the grain along a first generally arcuate path being displaced from the periphery of the roasting flame and then dropping the grain along a second generally linear path in which most of the grain falls across the drum and directly through the roasting flame, before returning to the first path, as the drum is rotated about its central axis.

More particularly, the first arcuate path begins at an approximately six o'clock position and extends through an approximately twelve o'clock position but with grain starting to drop into the linear path as it reaches an approximately nine o'clock position along the arcuate path. Further, the grain is moved in the longitudinal direction from the one end toward the other end of the drum concurrently as it is carried through the first arcuate path and dropped through the second linear path as the drum is rotated. Also, the grain is delivered into the drum in the longitudinally-extending direction but offset to one side of the central axis of said roasting drum, while the flame is produced in the longitudinally-extending direction but offset to the opposite other side of the central axis of the roasting drum. Finally, the roasted grain is discharged from the other end of the drum.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, right hand and left hand references are determined by standing at the rear of the machine and facing toward the front thereof. Also, in the following description, it is to be understood that such terms as "forward," "rearward," "left," "upward," etc. are words of convenience and are not to be construed as limiting terms.

In General

Figure 1:
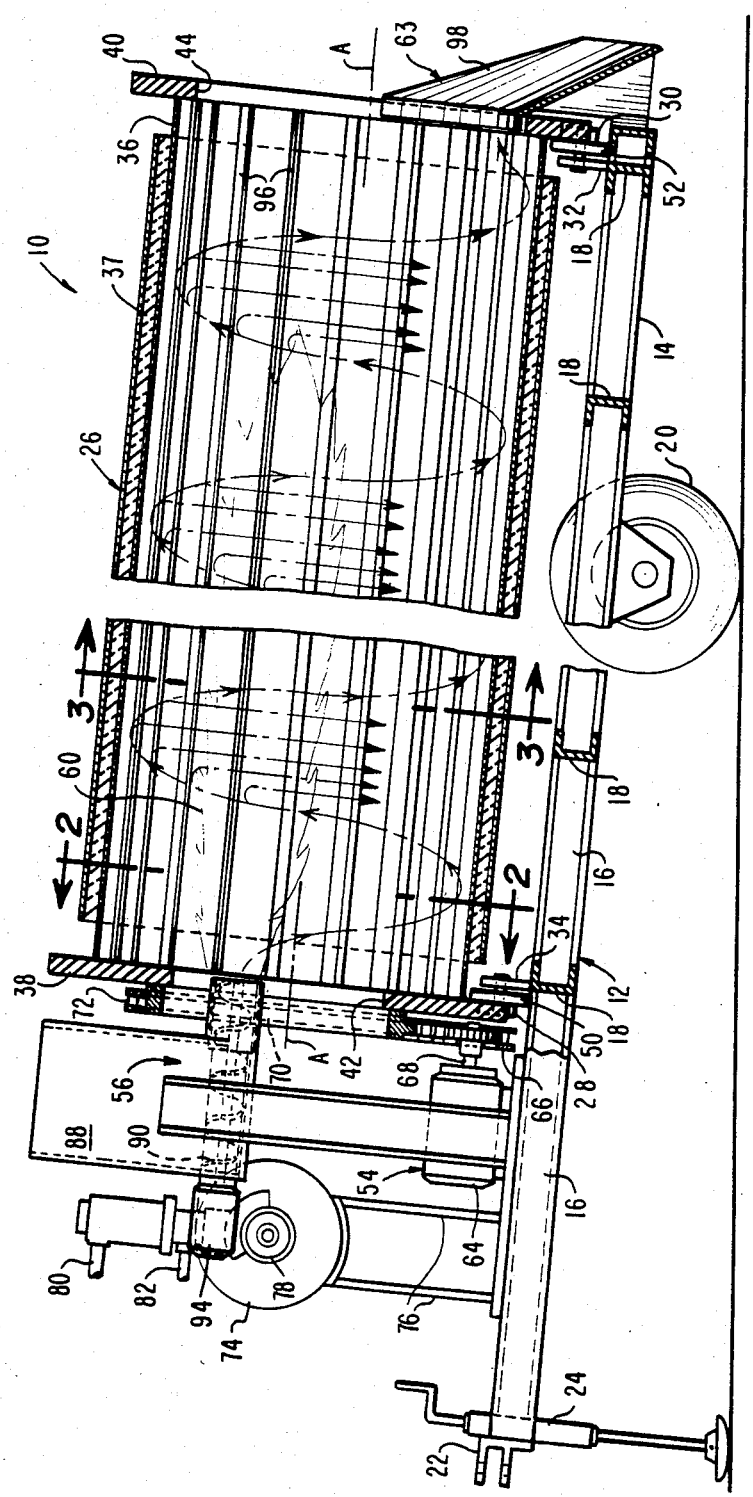
FIG. 1 is a side elevational view of the grain roasting machine incorporating the improved features of the present invention, with portions in sectional form to show the inside of the machine.

Referring now to the drawings, and particularly to FIG. 1, there is shown a grain roasting machine, being indicated generally by the numeral 10, which incorporates the preferred embodiments of the improved features comprising the present invention and the other invention claimed in the above cross-referenced application. The left side of the machine 10 is shown in FIG. 1 when one is standing to the rear of the machine and facing toward its front.

The machine 10 is provided with a mobile chassis, generally designated 12, which includes a load bed 14 formed by longitudinally extending channels 16, suitably interconnected by spaced transverse channels 18 and supported by a pair of wheels 20 (only one of which is seen in FIG. 1) spaced forwardly about a third of the length of the channels 16 from the rear end of the chassis. The longitudinal channels 16 converge into a clevis 22 at the front end of the chassis 12 which adapts the machine 10 to be secured to a suitable towing vehicle, located at its front end. A jack 24 attached to the front end of the chassis 12 adjacent the clevis 22 supports the front end when the machine 10 is detached from its towing vehicle.

The improved features of the present invention which relate to the basic overall arrangement of the machine 10 for achieving the roasting of grain so as to increase its digestability and nitritional value will be described in detail in the following section. A detailed description of the improved features of the invention of the above cross-referenced application relating to the construction of the roasting drum will be reserved for the next section.

Improved Arrangement for Roasting Grain

Figure 2:
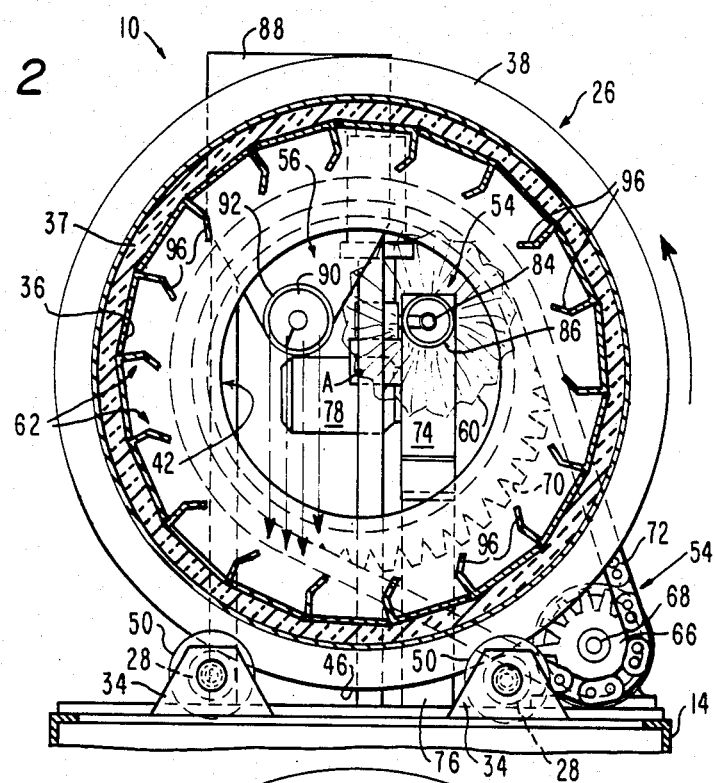
FIG. 2 is an enlarged fragmentary sectional view of the grain roasting machine taken along line 2—2 of FIG. 1.
Figure 3:
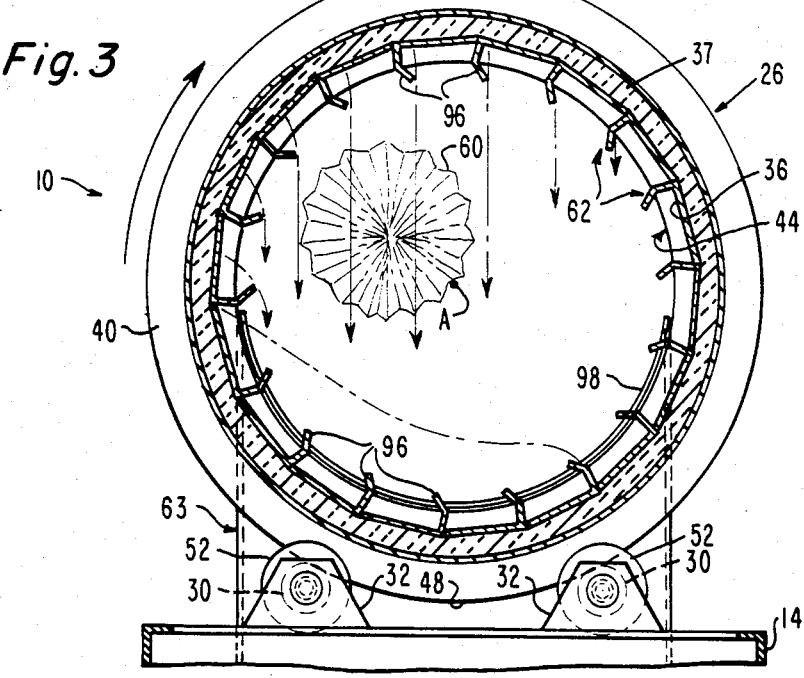
FIG. 3 is an enlarged fragmentary sectional view of the grain roasting machine taken along line 3—3 of FIG. 1.

Referring to FIGS. 2 and 3 as well as FIG. 1, the grain roasting machine 10 basically includes an elongated hollow roasting drum 26 preferably having a cylindrical configuration with a central longitudinal axis A and means supporting the drum 26 for rotation about its central axis A in the form of front and rear pairs of laterally spaced rollers 28,30. The rear pair of rollers 30 are rotatably mounted to a pair of laterally aligned, upstanding brackets 32 fixed on the load bed 14 at the rear end of the chassis 12, while the front pair of rollers 28 are rotatably mounted to a pair of laterally aligned, upright brackets 34 fixed on the chassis at a location displaced rearwardly about a third of the length of the channels 16 from the front end of the chassis 12. The drum 26 is rotatably supported by the pairs of rollers 28,30 on the load bed 14 such that its central axis A extends in the fore-and-aft direction of the machine 10.

More particularly, the drum 26 includes a continuous cylindrical sidewall 36 encased with insulation 37 with annular plates 38,40 attached to the sidewall at opposite front and rear ends of the drum and defining respective front and rear end central openings 42,44 in the drum. By a comparison of FIGS. 2 and 3, it will be readily seen that the front end opening 42 is smaller in diameter than the rear end opening 44. This is because, as will be described shortly, grain is introduced into the drum 26 through its front end opening 42 and discharged from the drum through its rear end opening 44, and a larger opening is required for discharging grain than for loading it.

The front and rear pairs of rollers 28,30 support the drum 26 by underlying and engaging the peripheral edges 46,48 of its front and rear annular plates 38,40. Further, the front and rear rollers 28,30 have respective annular flanges 50,52 attached at their respective rear and front sides. The flanges 50,52 have larger diameters than the respective rollers 28,30 to which they are attached such that together, as best seen in FIG. 1, the flanges interfit between the peripheral edges 46,48 of the annular end plates 38,40 of the drum 26 and thereby prevent the drum 26, as it rotates about its central axis A, from moving in a longitudinal direction and derailing from the stationarily-positioned rollers 28,30.

In addition, the grain roasting machine 10 basically includes drive means, generally designated 54, being coupled to the drum 26 for rotating the same about its central axis A and means 56 for delivering grain into the drum 26 through the front end opening 42 thereof as the drum is rotating. Also, the machine 10 has burner means, generally designated 58, for producing a roasting flame 60 within the drum 26 extending generally longitudinally of the drum from its front end opening 42 toward its rear end opening 44. Finally, the machine 10 includes conveying means, generally indicated as 62, disposed along the interior of drum sidewall 36 for moving grain within the drum 26 about and through the roasting flame 60 and discharging means 63 at the rear of the machine.

Specifically, the drive means 54 of the machine 10 includes a suitable motor 64, for instance one which is electrically operated, with a sprocket gear 66 attached to its output drive shaft 68, and a ring gear 70 fixed on the forward side of the front end plate 38 of the drum 26. The sprocket and ring gears 66,70 are vertically aligned and entrained by a drive chain 72 which transmits the rotary motion of the motor output drive shaft 68 to the roasting drum 26 via the gears 66,70. to cause rotation of the drum.

The burner means 58 of the machine 10 includes a blower 74 mounted on the load bed 14 forwardly of the drum 26 by vertical braces 76. The blower 74 is operated by another suitable motor 78, which like the motor 64 can be electrically operated. Both motors 64,78 receive their electrical power from a source (not shown) coupled thereto through a conduit 80. Also, the burner means 58 includes a source (not shown) of ignitable gas, such as butane, delivered through a conduit 82 to a nozzle 84 from which the gas is injected into and mixed with the flow of air generated by the blower 74. The air and gas mixture being directed toward the front end opening 42 of the drum 26 flows through a flame holding tube 86 of the burner means 58 where it is ignited and produces the roasting flame 60.

The grain delivering means 56 of the machine 10 is in the form of a hopper 88 for receiving and temporarily storing the grain to be roasted until needed and an auger 90 rotatably mounted in the bottom of the hopper 88 and extending forwardly thereof within a discharge tube 92 fixed to lower rear side of the hopper. As seen in FIG. 1, the grain discharge tube 92 extends into the front end opening 42 of the drum 26. Yet another suitable motor 94, such as an electrically operated one, is mounted on the lower forward side of the hopper 88 and drivingly coupled to the auger 90 for causing rotation of the same and thereby the delivery of grain into the drum.

In FIG. 2, it will be seen that the flame holding tube 86 of the burner means 58 is disposed at one side of the central axis A of the drum 26, while the discharge tube 92 of the grain delivering means 56 is disposed at about the same height as the flame tube 86 but on an opposite site of the central axis A. With such an arrangement, the grain is delivered into the front end opening 42 of the drum 26 in the longitudinally-extending direction of the drum central axis A but offset to one side thereof, while the roasting flame 60 is produced and directed through the same front end opening 42 and in the same longitudinally-extending direction generally parallel to but offset to the opposite other side of, the central axis A of the roasting drum 26.

Figure 4:
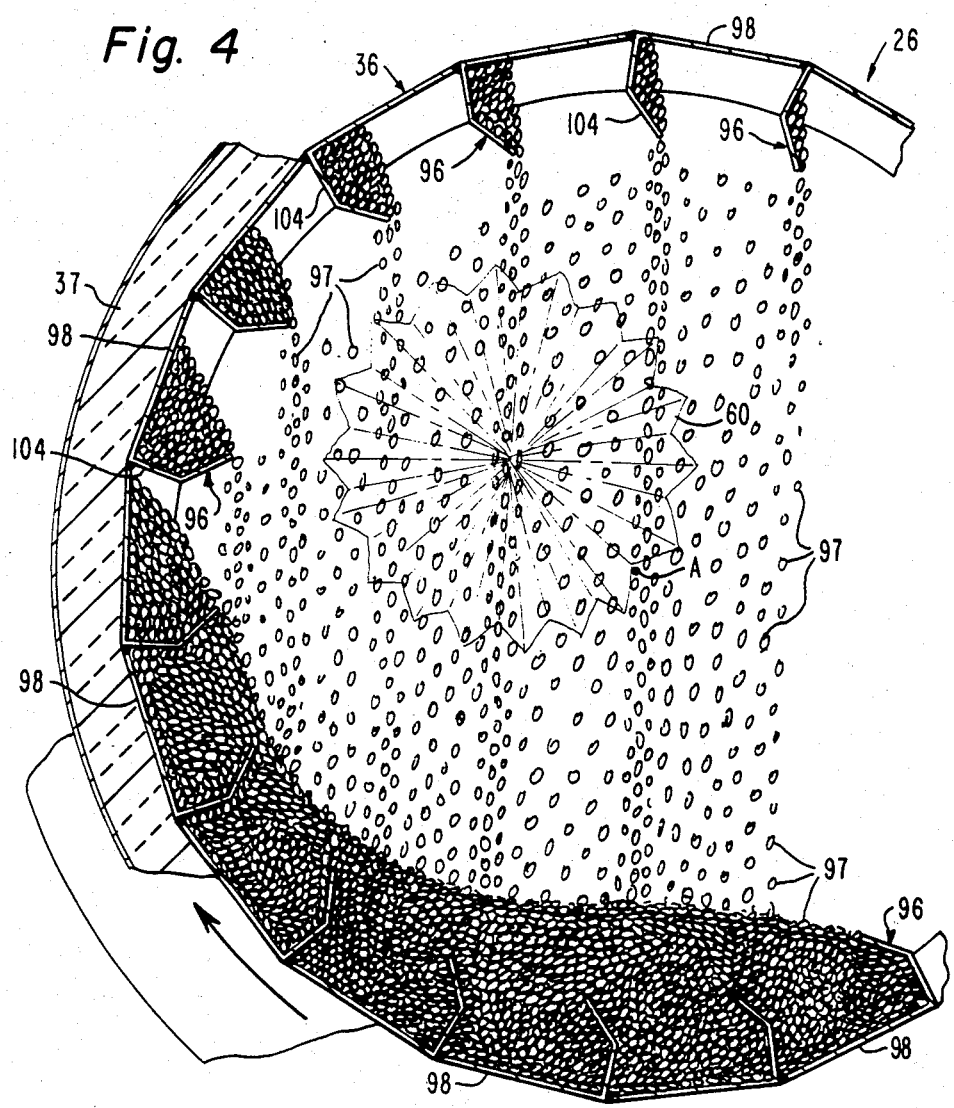
FIG. 4 is an enlarged fragmentary sectional view of the grain roasting machine similar to that of FIG. 3, but on a larger scale and schematically illustrating the relationship between the position of the burner flame within the roasting drum and the flow of grain across the rotating drum along generally vertical linear paths from the inner edges of the vanes which extend generally radially inward from the drum cylindrical wall.

The conveying means 62 of the machine 10 is in the form of a plurality of vanes 96 disposed on the interior of drum sidewall 36. Each vane 96 is of a generally shallow vee-shape in cross-section and extends generally radially inward from the interior of the drum 26 and longitudinally between the front and rear ends of the drum. As seen in FIGS. 2 to 4, the lower center edge of the vee of each vane 96 points in the opposite direction from that in which the drum 26 is rotated. Thus, the cross-sectional vee shape of each vane 96 forms a pocket for pushing grain 97 ahead of it and carrying the grain upwardly as the respective vane moves along an arcuate path beginning at an approximately six o'clock position in the clockwise rotational path of the drum and vanes as seen in FIG. 4. When an individual vane 96 reaches an approximately nine o'clock position along said arcuate path, grain 97 starts to drop from its pocket and by the time the vane has reached an approximately twelve o'clock position, it is practically empty. As the vane 96 moves along the generally arcuate path, it is located generally outside of the periphery of the roasting flame 60 and so the grain 97 skirts around the flame. Then, as the grain 97 beings dropping from the vane 96, it follows a generally vertical linear path downward in which most of the grain 97, as depicted in FIG. 4, falls across the drum 26 and directly through the roasting flame 60, before returning to the arcuate path. As seen in FIG. 4, in its longitudinally-extending generally parallel but offset relationship to the central axis A of the drum 26, the roasting flame 60 is located substantially in the nine o'clock to twelve o'clock sector of the drum 26 relative to its direction of rotation through which substantially all of the grain being carried by the vanes 96 of the drum is dropped from the vanes as the grain is moved along the arcuate path between the nine and twelve o'clock positions.

While still referring to FIG. 4, it should be pointed out that the specific design of the grain roasting machine 10 is such that a concentrated mass of the grain 97 flows through the flame 60. The relationship of the diameter of the drum 26 and its rotational speed, the number of and spacing between the vanes 96, and the radial length of the vanes 96 as well as the angle defining their vee-shaped cross section has taken into consideration in this design such that the overall cooperative effect results in a dense mass of the grain 96 passing through the flame 60. This concentrated flow or dense mass of grain in the flame minimizes the flame contact of individual pieces of the grain and thereby avoids burning or charring which damages the grain, while at the same time, such minimum flame contact sterilizes the grain in thereby reducing its toxicity and also enhances its flavor.

It will be noted in FIG. 1 that the front end of the chassis 12 is elevated above its rear end. This is a simple way of making the grain move from the front end opening 42 of the rotating drum 26 to its rear end opening 44 concurrently as the grain is carried by the vanes 96 through the arcuate path and dropped through the linear path and thereby roasted by the time it is ready for discharge from the rear end of the drum. The overall path of movement of the grain through the drum 26 is represented by the dashed lines with arrows appearing within the drum in FIG. 1. Other ways of moving the grain through the drum 26 will readily come to mind, such as parking the machine 10 on a slight grade sloping from front to rear or by supporting the drum 26 at an angle on the chassis 12 with the front end of the drum higher than its rear end.

The grain discharging means 63 takes the form of a chute 98 stationarily disposed on the rear end of the load bed 14 of the chassis 12 proximate the rear end opening 44 of the drum 26. Roasted grain is discharged from the drum 26 through its rear end opening 44 and down the chute 98 as the drum is rotating.

Improved Roasting Drum Construction

The elongated hollow drum 26 has a unique construction which makes it easier and simpler to assemble the cylindrical sidewall 36 and grain conveying vanes 96 of the drum at the same time. The structural integrity of the drum is also enhanced by the improved construction.

Figure 5:
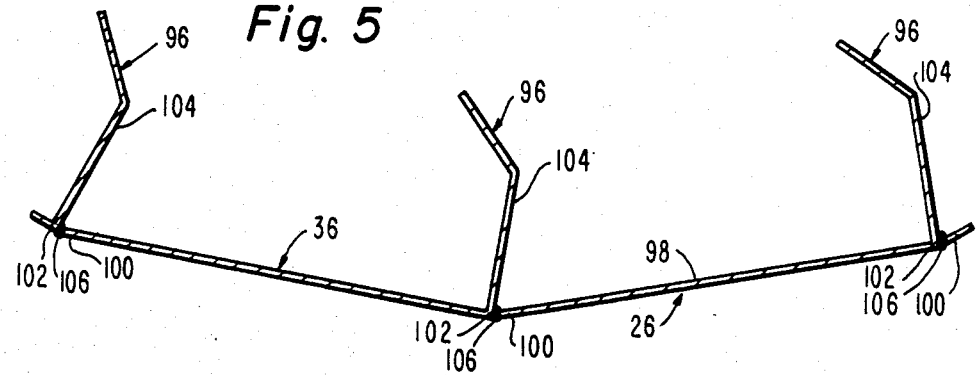
FIG. 5 is an enlarged fragmentary sectional view of the roasting drum, on a larger scale than that of FIG. 4, showing the cross-sectional configuration of several of a plurality of longitudinally extending plates which are connected together to form the drum.

Basically, referring to FIG. 5, the drum construction includes a plurality of elongated, generally flat plates 98 each having a pair of spaced opposite longitudinal edges 100,102. The plates 98 are arranged edge-to-edge in an endless succession with one edge 100 of one plate 98 rigidly connected to an oppsoite edge 102 of the succeeding plate 98 so as to form a ring-like structure which defines the continuous sidewall 36 of the drum 26 about the central longitudinal axis A.

Also, the drum construction includes a plurality of elongated flanges 104 each being integrally connected to one plate 98 along one of the edges 102 of the plate 98 and extending toward the central axis A so as to define the grain carrying vane 96 disposed in the interior of the drum 26. Thus, each of the plates 98 together with one of the flanges 104 have an integrally-formed one-piece construction with the flange 104 being bent with respect to the plate 98, preferably, at an approximately ninety-degree angle. Each flange 104 is further bent slightly along its longitudinal midline so as to have a shallow vee-shaped cross section. With each plate 98 and its flange 104 bent, as described, prior to being assembled with other plates, no additional bending or connections need to be carried out after the plates are connected together.

More particularly, one edge 102 of the pair of spaced opposite edges 100,102 of each plate 98 is an angle edge defined by the integral connection between the plate 98 and its flange 104, while the other edge 100 of the pair of spaced opposite edges of each plate 98 is a terminal edge. To construct the drum 26, the terminal edge 100 of each plate is rigidly connected to the angle edge 102 of each next plate, such as by a weld 106, until an endless succession of interconnected plates 98 is completed and the ring-line structure of the drum 26 is thereby formed.

It is thought that the improved features of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a method of roasting grain, the combination comprising the steps of:
   (a) rotating an elongated hollow roasting drum about its longitudinally-extending central axis;
   (b) directing a roasting flame into said drum in a longitudinal direction extending from a front end toward an opposite rear end of said drum, generally parallel to, but offset to one side of, said central axis of said drum such that said roasting flame is located in a nine o'clock to twelve o'clock sector of the drum relative to its direction of rotation;
   (c) delivering grain in said longitudinal direction into said drum at said front end thereof but offset to the opposite other side of said central axis of said rotating drum;
   (d) conveying grain within said drum by carrying said grain along a first generally arcuate path being displaced from the periphery of said roasting flame and then dropping said grain along a second generally linear path in which most of said grain falls across said drum at said one side of said drum central axis and directly through said roasting flame, returning to said first path, and by concurrently moving said grain from said front end toward said rear end of said drum as it is carried and dropped through said respective first and second paths, as said drum is rotated about is central axis, said first arcuate path beginning at an approximately six o'clock position in the direction of rotation of said drum and extending through an approximately twelve o'clock position but with grain starting to drop from said path as it reaches an approximately nine o'clock position therealong and substantially completing dropping upon reaching an approximately twelve o'clock position such that substantially all of the grain is dropped from said path through said roasting flame being located substantially in the nine o'clock to twelve sector of the drum relative to its direction of rotation; and (e) discharging roasted grain from said drum through said rear end thereof as said drum is rotated.

2. The combination as recited in claim 1, wherein said grain is moved from said front end toward said rear end of said drum by supporting said drum at an angle with said front end higher than said rear end of said drum.

3. The combination as recited in claim 1, wherein said grain is moved from said front end toward said rear end of said drum by parking a chassis supporting said drum on a slight grade sloping from said front end to said rear end of said drum.

* * * * *